Patented Dec. 25, 1951

2,580,070

UNITED STATES PATENT OFFICE 2,580,070

SYNTHESIS OF ACYL HALIDES

Richard E. Brooks and Irving D. Webb, Wilmington, Del., assignors to E. I. du Pont de Nemours & Company, Wilmington, Del., a corporation of Delaware No Drawing. Application March 11, 1948, Serial No. 14,384

5 Claims. (Cl. 260—544)

This invention relates to the synthesis of acyl halides. It relates more specifically to a novel process for the manufacture of acyl halides by a reaction between tertiary alkyl halides and carbon monoxide.

It has been reported heretofore that carbonylation products can be obtained by reaction between certain alkyl chlorides and carbon monoxide in the presence of anhydrous aluminium chloride (Thomas, Anhydrous Aluminum Chloride in Organic Chemistry, Rheinhold Publishing Corp., New York, N. Y., 1941, page 767). In general, however, it has not been possible to prepare acyl halides in substantial yields by any method which involves the use of alkyl chlorides and carbon monoxide as starting materials with aluminium chloride catalyst, because the destruction of the aluminium chloride catalyst by hydrolysis, prior to isolation of the organic product, is an essential step in such processes, and this hydrolysis causes loss of any acyl halide which may be present.

An object of this invention is to provide improvements in processes for the synthesis of acyl halides. Another object is to provide an improved process for the synthesis of acyl halides by reaction between tertiary alkyl halides and carbon monoxide in the presence of catalysts. A further object is to provide a novel process for the manufacture of trimethylacetyl chloride. Other objects of the invention will appear hereinafter.

It has been discovered in accordance with this invention that tertiary halides react with carbon monoxide under conditions herein set forth to form acyl halides in accordance with the following equation:

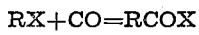

in which R is a tertiary group, and X is a halogen atom, preferably a halogen atom having an atomic weight of from 35 to 80. In general the reaction between tertiary halides and carbon monoxide takes place in accordance with this invention in the presence of boron trifluoride or bismuth trichloride catalyst, preferably at temperatures within the range of —25° to +200° C. at elevated pressures.

The quantity of boron trifluoride which is preferably employed in the reaction mixture in the practice of the invention may be varied rather widely but best results are obtained when about 1 mole, or more, of boron trifluoride is used per mole of tertiary alkyl halide. Generally it is desirable that the reaction mixture remain substantially anhydrous throughout the course of the reaction, since relatively small amounts of water tend to diminish the activity of the boron trifluoride catalyst in the said reaction between the tertiary alkyl halide and carbon monoxide. If a bismuth trichloride catalyst is employed, a relatively small amount, about 2% to 30%, based on the weight of the tertiary halide, thereof is sufficient.

Any tertiary chloride or bromide (i. e. a chloride or bromide in which the halogen is attached to a tertiary carbon atom) may be employed in the practice of the invention. Suitable tertiary alkyl chlorides and bromides which give satisfactory results include tertiary butyl chloride, tertiary butyl bromide, tertiary amyl chloride, tertiary amyl bromide, 3-chloro-3-methyl hexane, etc. Chlorine or bromine-substituted tertiary alkyl chlorides and bromides may also be employed.

The process of the invention may be carried out at any convenient superatmospheric pressure, excellent results being obtained at pressures in excess of 10 atmospheres. Optimum pressures from the standpoint of high yields and rapid rates of reaction are within the range of about 10 to 1,000 atmospheres, or higher.

In specific embodiments the reaction mixture may contain, in addition to the tertiary halide, carbon monoxide and boron trifluoride, a reactant which is capable of converting the acyl halide which is initially produced to another acyl halide. For example, hydrogen fluoride may be added to the reaction mixture, and a product containing acyl fluoride may thus be produced.

Preferably the temperature at which tertiary halides react with carbon monoxide in the presence of boron trifluoride to form the desired acyl halide in the practice of the invention should not be excessively high, because at temperatures in excess of about 200° C. the yield of acyl halide is relatively poor. Outstanding results are obtained at relatively low temperatures, e. g. at temperatures in the range of about 0° to 25° C., especially at pressures in excess of about 200 atmospheres.

If desired the tertiary halide employed as a reactant in the practice of the invention may be produced in situ, e. g. by reaction between a tertiary olefin such as isobutylene, and a hydrogen halide.

The invention is illustrated further by means of the following examples.

*Example 1.*—A mixture containing equimolar quantities of tertiary butyl chloride and boron trifluoride is subjected to the action of carbon monoxide at a pressure of 700 atmospheres and a temperature of 0° C. for 1.25 hours. The resulting product contains 0.49 mole of trimethylacetyl chloride per mole of tertiary butyl chloride charged. The unreacted tertiary butyl chloride is recovered; yield of trimethylacetyl chloride based upon the quantity of tertiary butyl chloride which had reacted is virtually quantitative.

Example 2.—A mixture containing equimolar quantities of tertiary amyl bromide and boron trifluoride is subjected to the action of carbon monoxide at a pressure of 700 atmospheres and a temperature of 0° C. for 1.25 hours a virtually quantitative yield of alpha, alpha-dimethylpropionyl bromide is obtained.

Example 3.—In a series of experiments tertiary butyl chloride is reacted with carbon monoxide under the conditions set forth in the following table. The table illustrates the relative effectiveness of various catalysts in accelerating the reaction between tertiary butyl chloride and carbon monoxide to form trimethylacetyl chloride.

TABLE 1

*Reaction of tertiary butyl chloride with carbon monoxide at 700 atmospheres pressure*

| Charge | Catalyst | Mol Ratio, Tertiary Butyl Chloride: $BF_3$ | Solvent | Temp. | Time | Product Isolated | Conv. | Yield |
|---|---|---|---|---|---|---|---|---|
| | | | | | Hours | | Per Cent | Per Cent |
| t-$C_4H_9Cl$ | $BF_3$ | 1:1 | | 25 | 1 | Trimethylacetyl chloride. | 25 | 50 |
| i-$C_4H_8$ and HCl. | do | 1:1 | | 0 | 1½ | do | 10 | 63 |
| Do | 1% $BiCl_3$ | | | 150 | ¾ | do | 13 | |
| Do | 5% $BiCl_3$ | | Cyclohexane. | 150 | 1 | do | 20 | (¹) |
| t-$C_4H_9Cl$ | 10% $BiCl_3$ | | | 50 | 2 | Hydrolyzed to acid. | 5 | |
| Do | 2% $SnCl_4$ | | Cyclohexane. | 150 | ½ | | 0 | |

¹ High.

It is to be understood that the foregoing examples are illustrative only and are not intended to limit the invention, since numerous methods of practicing the invention will occur to those who are skilled in the art. For example the process of the invention can be operated either batchwise or continuously. In the continuous process the boron trifluoride catalyst may be injected at one or more points along the vessel if desired. Suitable diluents may be employed but in general these are neither necesary nor desirable. Substances which form complexes with the boron trifluoride may also be present but in general no substantial benefits result thereby. Auxiliary catalysts such as mineral acids etc., may be used but only very minor advantages, if any, are gained in this manner.

Any suitable method for separating the acyl halide from the reaction product may be employed in the practice of the invention. For example, the boron trifluoride can be recovered as a gas from the reaction mixture, and the acyl halide in the remaining product can be purified by simple distillation of the non-gaseous phase. Boron trifluoride does not interfere with the distillation of the acyl halides obtained in accordance with the invention.

Since numerous embodiments of the invention can be made without departing from the spirit and scope thereof it is to be understood that we do not limit ourselves except as set forth in the following claims.

We claim:

1. A process for the synthesis of acyl halides of the formula RCOX, wherein R is a tertiary alkyl group containing from 4 to 7 carbon atoms, and X is a halogen atom of the class consisting of chlorine and bromine, which comprises interacting an alkyl halide of the formula RX with carbon monoxide in the presence of boron trifluoride, at a temperature of −25° to +200° C., under a pressure in excess of 10 atmospheres, whereby an acyl halide of the formula RCOX is produced, and thereafter separating the said acyl halide from the resulting mixture.

2. A process for the synthesis of trimethylacetyl chloride which comprises interacting tertiary butyl chloride with carbon monoxide at a temperature of −25° to +200° C. in the presence of anhydrous boron trifluoride catalyst under a pressure of from 10 to 1,000 atmospheres whereby trimethylacetyl chloride is produced, and thereafter separating trimethylacetyl chloride from the resulting mixture.

3. A process for the synthesis of trimethylacetyl chloride which comprises interacting tertiary butyl chloride with carbon monoxide at a temperature of 0° to 25° C. in the presence of anhydrous boron trifluoride catalyst under a pressure of from 10 to 1,000 atmospheres whereby trimethylacetyl chloride is produced, and thereafter separating trimethylacetyl chloride from the resulting mixture.

4. A process for the synthesis of trimethylacetyl chloride which comprises interacting tertiary butyl chloride with carbon monoxide at a temperature of 0° to 25° C. in the presence of anhydrous boron trifluoride catalyst under a pressure of from 200 to 1,000 atmospheres whereby trimethylacetyl chloride is produced, and thereafter separating trimethylacetyl chloride from the resulting mixture.

5. The process of claim 4 in which the quantity of $BF_3$ catalyst is about one mole per mole of tertiary butyl chloride charged.

RICHARD E. BROOKS.
IRVING D. WEBB.

REFERENCES CITED

The following references are of record in the file of this patent:

UNITED STATES PATENTS

| Number | Name | Date |
|---|---|---|
| 2,034,850 | Whitmore | Mar. 24, 1936 |
| 2,053,233 | Woodhouse | Sept. 1, 1936 |
| 2,062,344 | Wiezerich et al. | Dec. 1, 1936 |
| 2,378,048 | Theobald | June 12, 1945 |
| 2,411,982 | Theobald | Dec. 3, 1946 |